(12) United States Patent
Leu et al.

(10) Patent No.: US 7,147,993 B2
(45) Date of Patent: Dec. 12, 2006

(54) LIGHT GUIDE PLATE WITH METAL DOTS AND METHOD FOR FABRICATING THE SAME

(75) Inventors: Charles Leu, Fremont, CA (US); Tai-Cherng Yu, Tu-chen (TW); Ga-Lane Chen, Fremont, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 210 days.

(21) Appl. No.: 10/887,778

(22) Filed: Jul. 9, 2004

(65) Prior Publication Data

US 2005/0007757 A1 Jan. 13, 2005

(30) Foreign Application Priority Data

Jul. 9, 2003 (TW) ............................... 92118776 A

(51) Int. Cl.
*G02F 1/1335* (2006.01)
(52) U.S. Cl. ...................................... 430/321; 264/1.24
(58) Field of Classification Search ..................... None
See application file for complete search history.

(56) References Cited

U.S. PATENT DOCUMENTS

| 2003/0080450 | A1* | 5/2003 | Taniguchi et al. ........... 264/2.5 |
| 2004/0227262 | A1* | 11/2004 | Kim .......................... 264/1.24 |
| 2005/0276914 | A1* | 12/2005 | Liu et al. .................... 427/133 |

* cited by examiner

Primary Examiner—John A. McPherson
(74) Attorney, Agent, or Firm—Wei Te Chung

(57) ABSTRACT

A method for fabricating a light guide plate (LGP) includes: providing a substrate (300) having a thermal stripping layer (400) and a metal layer (500) sequentially coated thereon; coating a photo-resist layer (600) on the metal layer; exposing and developing the photo-resist layer to form a photo-resist pattern (620); etching the substrate to form a metal pattern (540); removing the photo-resist pattern; disposing the substrate having the metal pattern between a case mold (720) and a cover mold (740), wherein the metal pattern faces the cover mold; sealing the cover mold and the case mold around the substrate having the metal pattern, wherein a cavity (760) is defined between the cover mold and the substrate having the metal pattern, and molding an LGP (800) in the cavity; and separating the thermal stripping layer and substrate from the LGP, such that the metal pattern remains embedded in the LGP.

11 Claims, 5 Drawing Sheets

LIGHT GUIDE PLATE WITH METAL DOTS AND METHOD FOR FABRICATING THE SAME

BACKGROUND OF THE INVENTION

1. Field of the Invention

The present invention relates to light guide plates typically used in devices such as liquid crystal displays (LCDs), and particularly to a light guide plate with metal dots and a method for fabricating the light guide plate.

2. Description of the Prior Art

A liquid crystal display is capable of displaying a clear and sharp image through millions of pixels of image elements. It has thus been applied to various electronic equipment in which messages or pictures need to be displayed, such as mobile phones and notebook computers. However, liquid crystals in the liquid crystal display do not themselves emit light. Rather, the liquid crystals have to be lit up by a light source so as to clearly and sharply display text and images. The light source may be ambient light, or a backlight system attached to the liquid crystal display.

A conventional backlight system generally comprises a plurality of components, such as a light source, a reflective plate, a light guide plate, a diffusion plate and a prism layer. Among these components, it is generally believed that the light guide plate is the most crucial component in determining the performance of the backlight system. The light guide plate serves as an instrument for receiving light beams from the light source, and for evenly distributing the light beams over an entire output surface of the light guide plate through reflection and diffusion. In order to keep light evenly distributed over an entire surface of the associated liquid crystal display, the diffusion plate is generally arranged on top of the output surface of the light guide plate.

Referring to FIG. 10, a conventional light guide plate 100 is thin and flat. The light guide plate 100 is made of a transparent organic resin, such as polymethyl methacrylate (PMMA). The light guide plate 100 includes an emission surface 120 and a bottom surface 140 opposite to the emission surface 120. A plurality of dots 160 is located on the bottom surface 140. The dots 160 are made of a transparent resin. The dots 160 can scatter and reflect incident light beams, so as to totally eliminate internal reflection of the light beams and make the light beams evenly emit from the emission surface 120.

However, because the dots 160 are transparent, some light beams emit from the light guide plate 100 through the dots 160. The resulting light wastage decreases the brightness of the light guide plate 100.

SUMMARY OF THE INVENTION

Accordingly, an objective of the present invention is to provide a method for fabricating a light guide plate, the light guide plate having metal dots.

Another objective of the present invention is to provide a light guide plate having metal dots.

In order to achieve the first above-mentioned objective, a method for fabricating a light guide plate comprises the following steps: providing a substrate having a thermal stripping layer and a metal layer sequentially coated thereon; coating a photo-resist layer on the metal layer; exposing and developing the photo-resist layer to form a photo-resist pattern; etching the substrate to form a metal pattern; removing the photo-resist pattern; disposing the substrate having the metal pattern between a case mold and a cover mold, wherein the metal pattern faces the cover mold; sealing the cover mold and the case mold around the substrate having the metal pattern, wherein a cavity is defined between the cover mold and the substrate having the metal pattern, and molding a light guide plate in the cavity; and separating the thermal stripping layer and substrate from the light guide plate, such that the metal pattern remains embedded in the light guide plate.

In order to achieve the second above-mentioned objective, a light guide plate comprises a bottom surface, an emission surface which is opposite to the bottom surface, an incident surface which interconnects the bottom surface and the emission surface, and a plurality of metal dots embedded in the light guide plate at the bottom surface.

The light guide plate has the plurality of dots embedded at the bottom surface. The dots are made of a metal having a high light reflectivity, for example aluminum. Few light beams can emit from the light guide plate through the dots. This can greatly decrease light wastage and increase the brightness of light emitting from the emission surface.

Other objects, advantages and novel features of the present invention will be apparent from the following detailed description of preferred embodiments thereof with reference to the attached drawings, in which:

DETAILED DESCRIPTION OF THE INVENTION

As shown in FIGS. 1~8, a method for fabricating a light guide plate in accordance with the present invention includes eight steps.

Figure 1:
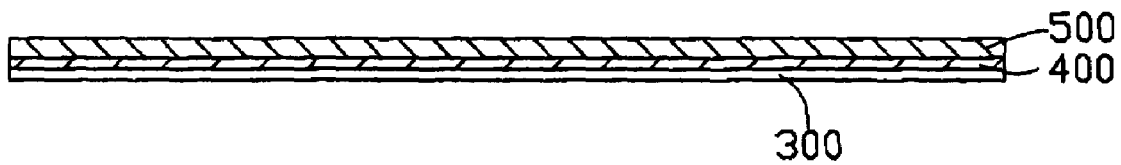
FIG. 1 is a schematic, side cross-sectional view of a substrate having a thermal stripping layer and a metal layer sequentially coated thereon, according to the method of the present invention.

In the first step, a substrate 300 having a thermal stripping layer 400 and a metal layer 500 sequentially coated thereon is provided, as shown in FIG. 1. The substrate 300 is made of macromolecular polymer, such as polyethylene terephthalate (PET) or polycarbonate (PC). The metal layer 500 is made of a metal having a high light reflectivity, such as aluminum (Al). A thickness of the metal layer 500 is in the range from 0.3~0.5 μm.

Figure 2:
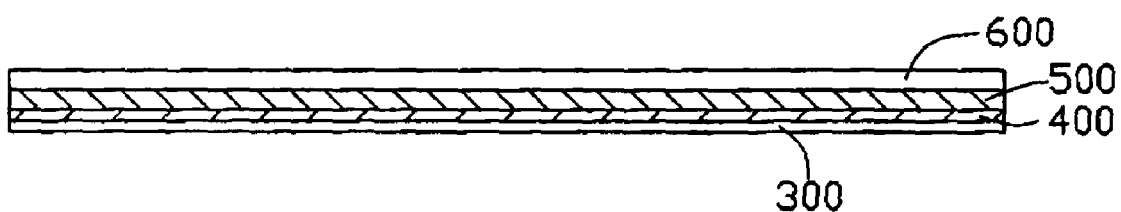
FIG. 2 is similar to FIG. 1, but showing a photo-resist layer coated on the metal layer of the substrate.

In the second step, a photo-resist layer 600 is coated on the metal layer 500, as shown in FIG. 2. The photo-resist layer 600 is an organic, positive photo-resist such as Bakelite™. Alternatively, a negative photo-resist can be used. The method of coating the photo-resist material is spin-coating or spray-coating.

Figure 3:
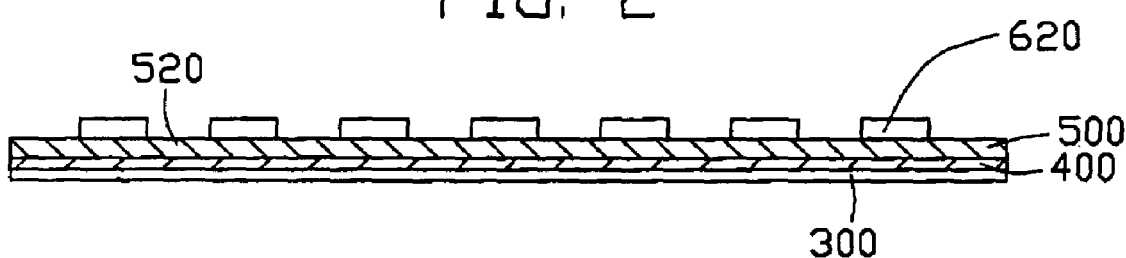
FIG. 3 is similar to FIG. 2, but showing the substrate after exposing and developing have been completed, whereby a photo-resist pattern is formed on the metal layer.

In the third step, the photo-resist layer 600 is exposed and developed, as shown in FIG. 3. Ultraviolet (UV) radiation is projected through a photo-mask (not shown) onto the photo-resist layer 600. The photo-mask has a predetermined pattern. Parts of the photo-resist layer 600 receiving the UV radiation react to become capable of being dissolved by a developer. A developer is then spraying onto the photo-resist layer 600, and the substrate 300 is kept static for 30~60 seconds. The developer is preferably sodium hydroxide (NaOH). The exposed parts (not shown) are dissolved by the developer. Therefore, the pattern of the photo-mask is transferred to the photo-resist layer 600 to form a photo-resist pattern 620. The photo-resist pattern 620 covers parts of the metal layer 500, and defines bare metal areas 520 of the metal layer 500 that are not covered by the photo-resist pattern 620.

Figure 4:
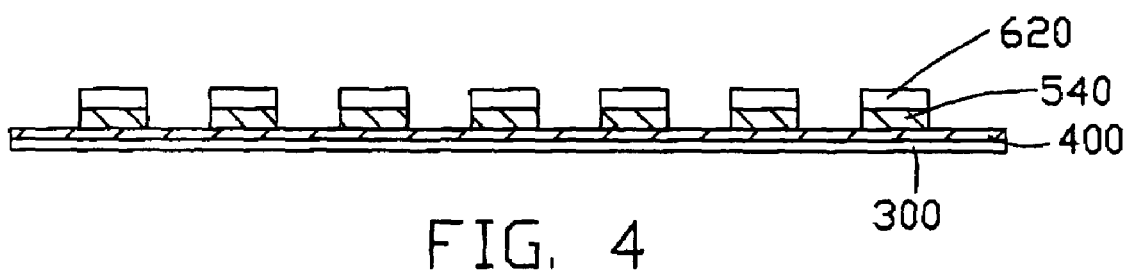
FIG. 4 is similar to FIG. 3, but showing the substrate after etching has been completed, whereby a metal pattern is formed on the thermal stripping layer.

In the fourth step, the substrate 300 is etched. An etchant is sprayed onto the substrate 300. The etchant is a mixture of phosphoric acid, nitric acid, acetic acid, water, and a humectant. The etchant etches and removes the bare metal areas 520 of the metal layer 500. A metal pattern 540 having the pattern of the photo-mask is thereby formed, as shown in FIG. 4.

Figure 5:
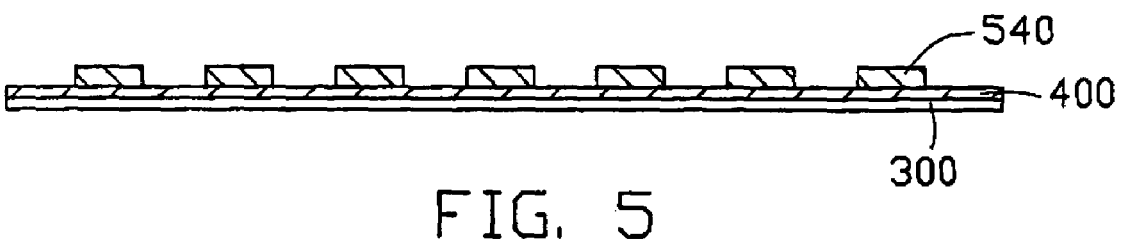
FIG. 5 is similar to FIG. 4, but showing the substrate after the photo-resist pattern has been removed.

In the fifth step, the photo-resist pattern 620 is removed, as shown in FIG. 5. A photo-resist stripping solvent is sprayed onto the substrate 300 to remove the photo-resist pattern 620, thereby leaving the metal pattern 540 on the thermal stripping layer 400.

Figure 6:
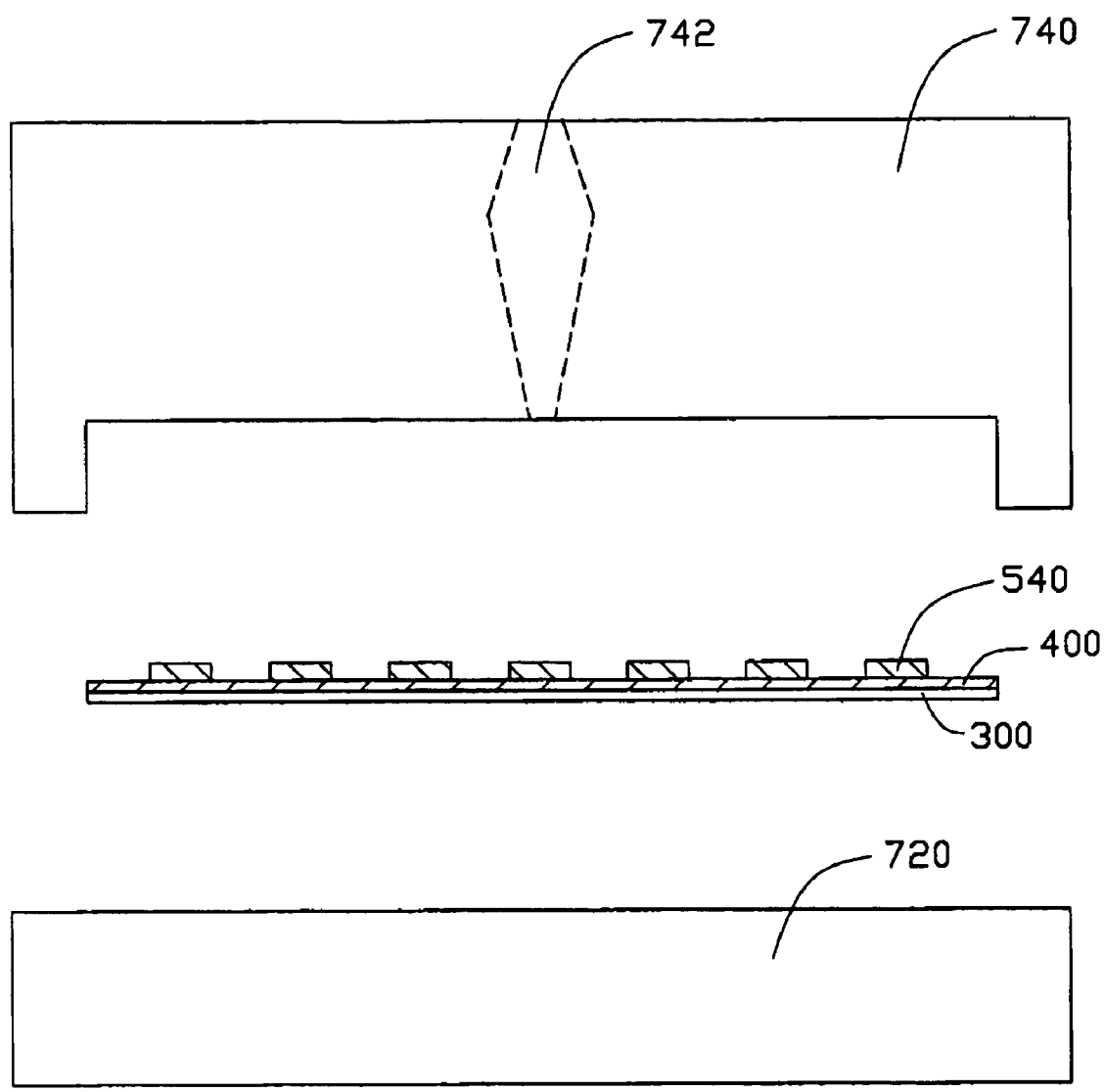
FIG. 6 is a schematic, side cross-sectional view of the substrate of FIG. 5 disposed between a cover mold and a case mold.

In the sixth step, the substrate 300 with the metal pattern 540 is disposed between a case mold 720 and a cover mold 740, with the metal pattern 540 facing the cover mold 740, as shown in FIG. 6. The case mold 720 and the cover mold 740 are made of a metal having high thermal conductivity, such as copper (Cu), a copper alloy or beryllium copper (BeCu). Nickel (Ni), nickel cobalt (NiCo), nickel phosphorus (NiP), silicon carbide (SiC), titanium carbon (TiC) or chromium (Cr) is implanted into the case mold 720 and the cover mold 740 in order to increase their rigidity. The cover mold 740 includes a sprue 742 running therethrough.

Figure 7:
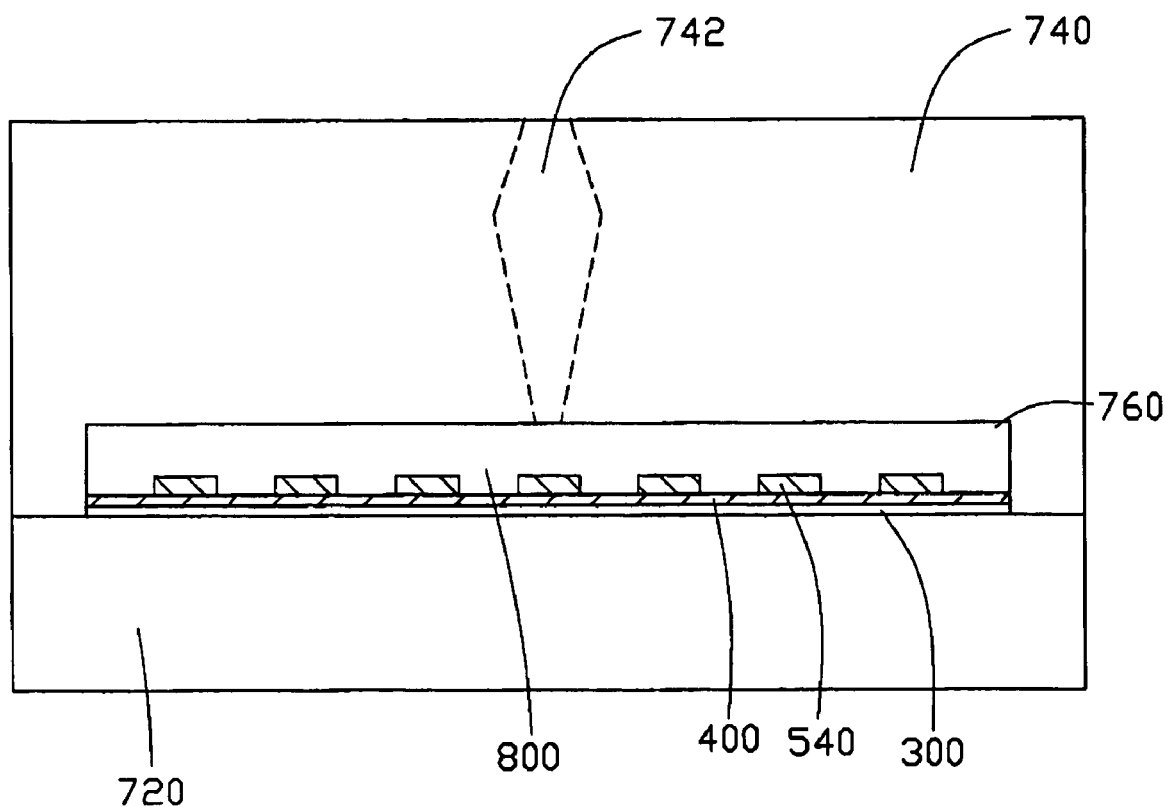
FIG. 7 is similar to FIG. 6, but showing the cover mold placed on the case mold, with the substrate located on the case mold, whereby a cavity is formed between the cover mold and the substrate.

In the seventh step, the cover mold 740 is placed on the case mold 720, with the substrate 300 abutting an inner face of the case mold 720. A cavity 760 is thereby defined between the cover mold 740 and the substrate 300 having the metal pattern 540. The cover mold 740 and the case mold 720 are thus sealed, with the sprue 742 communicating with the cavity 760, as shown in FIG. 7. Transparent resin is injected into the cavity 760 through the sprue 742, to form a light guide plate 800. The transparent resin is preferably polymethyl methacrylate (PMMA) or polycarbonate (PC). The transparent resin can be mixed with a demolding agent, an ultraviolet absorbent, a dye, and an antioxidant, so that the transparent resin has excellent optical performance. An injecting flux is less than $6 \times 10^{-3}$ m$^3$/s. A temperature of the transparent resin is in the range from 170~300° C. A viscosity of the transparent resin is in the range from 50~5000 Pa.sec. The light guide plate 800 is thus formed by injection molding.

Figure 8:
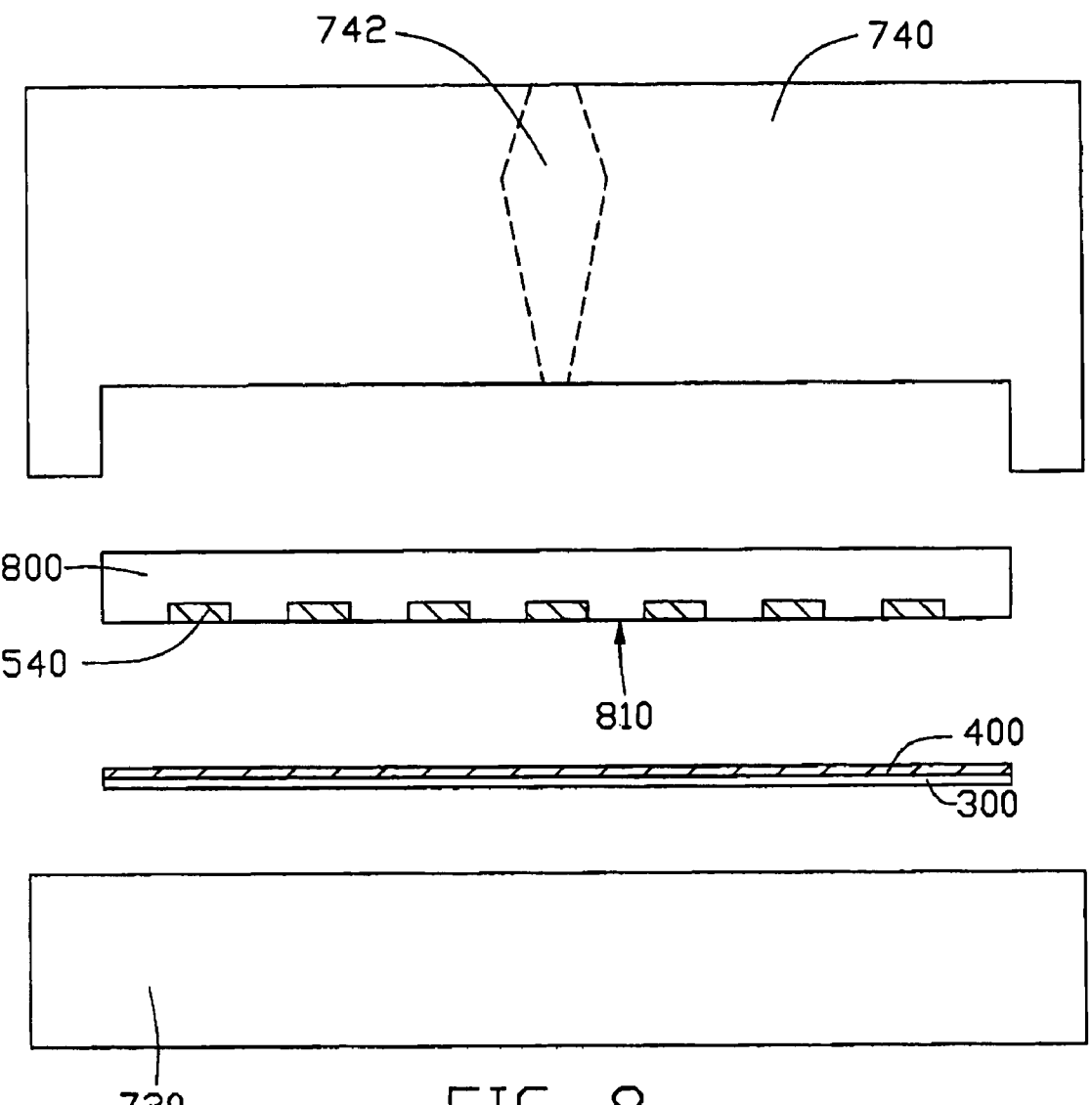
FIG. 8 is similar to FIG. 7, but showing a formed light guide plate separated from the substrate after cooling, demolding and stripping have been completed.

In the eighth step, the cover mold 740 and the case mold 720 are cooled to below 110° C. The light guide plate 800 is taken out from between the cover and case molds 740, 720. The thermal stripping layer 400 is separated from the light guide plate 800, so that from the substrate 300 and thermal stripping layer 400 are completely detached from the light guide plate 800. The metal pattern 540 thus remains embedded in the light guide plate 800 at a bottom surface 810 thereof, as shown in FIG. 8. The metal pattern 540 constitutes dots of the light guide plate 800. That is, the light guide plate 800 having metal dots is formed.

Figure 9:
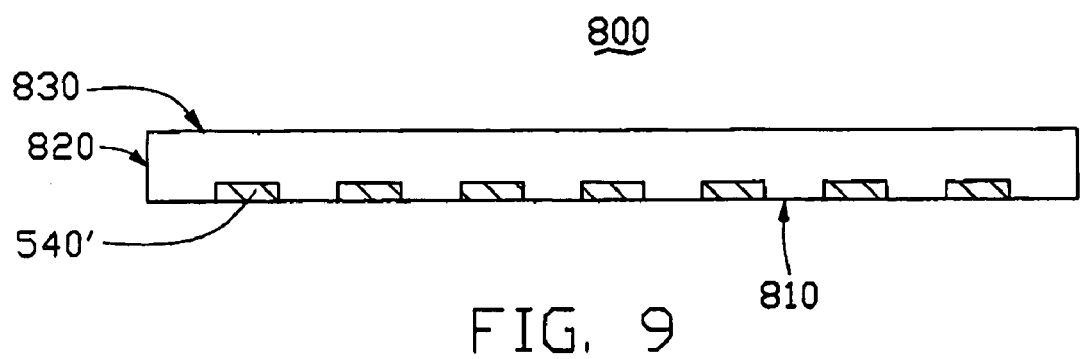
FIG. 9 is an isolated view of the light guide plate of FIG. 8.
Figure 10:
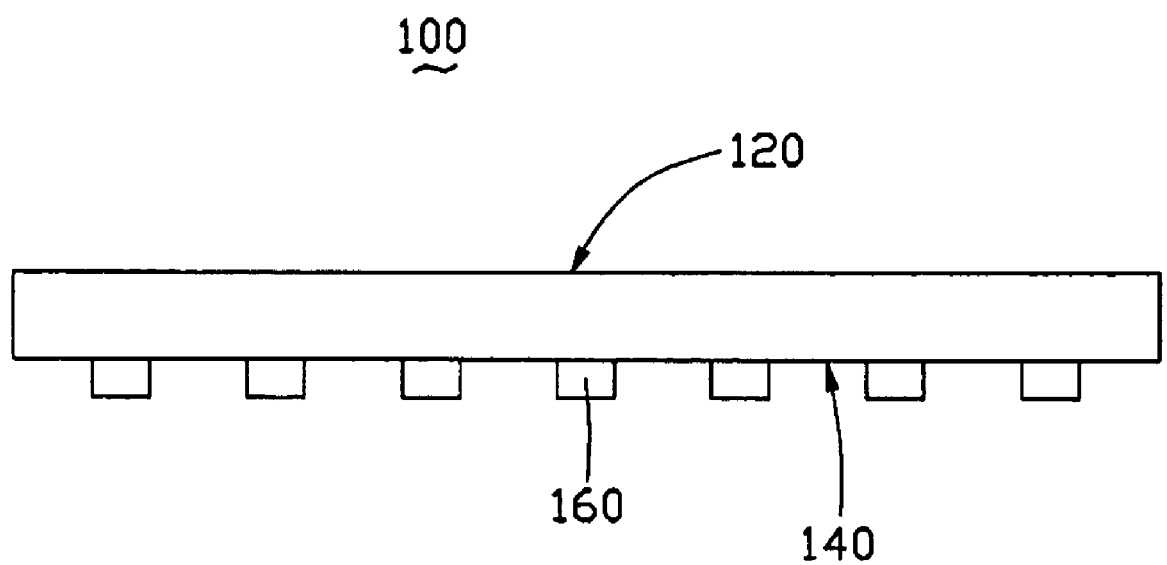
FIG. 10 is a schematic, side view of a conventional light guide plate.

Referring to FIG. 9, the light guide plate 800 fabricated by the method of the present invention includes the bottom surface 810, an incident surface 820 and an emission surface 830. The bottom surface 810 is opposite to the emission surface 830. The incident surface 820 interconnects the bottom surface 810 and the emission surface 830. A plurality of dots 540' is embedded in the light guide plate 800 at the bottom surface 810. The dots 540' are made of the metal having a high light reflectivity, such as Al. A thickness of the dots 540' is in the range from 0.3~0.5 μm.

In summary, the light guide plate 800 of the present invention has the plurality of dots 540'. The dots 540' are embedded in the light guide plate 800 at the bottom surface 810. The dots 540' are made of a metal (e.g., Al) having a high light reflectivity. Few light beams can emit from the light guide plate through the dots 540'. This can greatly decrease light wastage and increase the brightness of light emitting from the emission surface 830.

It is to be understood that even though numerous characteristics and advantages of the present invention have been set out in the foregoing description, together with details of the structure, steps and function of the invention, the disclosure is illustrative only, and changes may be made in detail, especially in matters of arrangement of parts and steps within the principles of the invention to the full extent indicated by the broad general meaning of the terms in which the appended claims are expressed.

We claim:

1. A method for fabricating a light guide plate, comprising: providing a substrate having a thermal stripping layer and a metal layer sequentially coated thereon; coating a photo-resist layer on the metal layer; exposing and developing the photo-resist layer to form a photo-resist pattern; etching the substrate to form a metal pattern; removing the photo-resist pattern; disposing the substrate having the metal pattern between a case mold and a cover mold, wherein the metal pattern faces the cover mold; sealing the cover mold and the case mold around the substrate having the metal pattern, wherein a cavity is defined between the cover mold and the substrate having the metal pattern, and molding a light guide plate in the cavity; and separating the thermal stripping layer and substrate from the light guide plate, such that the metal pattern remains embedded in the light guide plate.

2. The method for fabricating a light guide plate as recited in claim 1, wherein the substrate is made of polyethylene terephthalate (PET).

3. The method for fabricating a light guide plate as recited in claim 1, wherein the substrate is made of polycarbonate (PC).

4. The method for fabricating a light guide plate as recited in claim 1, wherein the photo-resist layer is spray-coated on the metal layer.

5. The method for fabricating a light guide plate as recited in claim 1, wherein the photo-resist layer is spin-coated on the metal layer.

6. The method for fabricating a light guide plate as recited in claim 1, wherein the metal layer is made of a metal having light reflectivity.

7. The method for fabricating a light guide plate as recited in claim 6, wherein the metal comprises aluminum.

8. The method for fabricating a light guide plate as recited in claim 1, wherein a developer used for developing the photo-resist layer is sodium hydroxide (NaOH).

9. The method for fabricating a light guide plate as recited in claim 1, wherein an etchant used for etching the substrate is a mixture of phosphoric acid, nitric acid, acetic acid, water, and a humectant.

10. The method for fabricating a light guide plate as recited in claim 1, wherein the method for molding the light guide plate is injection molding.

11. A method for fabricating a light guide plate, comprising: disposing a substrate having a thermal stripping layer and a metal pattern between a case mold and a cover mold, wherein the metal pattern faces the cover mold; sealing the cover mold and the case mold around the substrate having the metal pattern, wherein a cavity is defined between the cover mold and the substrate having the metal pattern, and molding a light guide plate in the cavity; and separating the thermal stripping layer and substrate from the light guide plate, such that the metal pattern remains embedded in the light guide plate.

* * * * *